Oct. 6, 1970 R. D. PARSONS 3,532,347
TAPE PLAYER FOR PLAYING CARTRIDGES WITH
DIFFERENT NUMBERS OF TRACKS
Filed May 4, 1967

INVENTOR
ROY D. PARSONS
BY
Wolf, Greenfield & Hieken
ATTORNEYS

United States Patent Office 3,532,347

Patented Oct. 6, 1970

3,532,347

TAPE PLAYER FOR PLAYING CARTRIDGES WITH DIFFERENT NUMBERS OF TRACKS

Roy D. Parsons, Melrose, Mass., assignor to Automatic Radio Manufacturing Co., Inc.

Filed May 4, 1967, Ser. No. 636,143
Int. Cl. G11b *5/00;* H04m *1/02*
U.S. Cl. 274—4 8 Claims

ABSTRACT OF THE DISCLOSURE

The tape player automatically plays 4-track or 8-track cartridges with the same scanning head arranged so that the head is sequentially displaced to a position opposite the next pair of tracks to be scanned, automatically skipping the second and fourth positions and slightly vertically displacing the head when a 4-track cartridge is being scanned.

BACKGROUND OF THE INVENTION

The present invention relates in general to tape players for playing cartridges having different numbers of tracks and more particularly concerns a novel tape player for playing both 4-track and 8-track cartridges and automatically positioning the head so that it is always in substantially the best position for scanning a selected pair of tracks. These results are obtained with the addition of relatively little structure at relatively little additional cost that operates with great reliability for many operations to insure optimum performance from apparatus regardless of what cartridge is inserted.

Conventional 4-track endless tape cartridges typically have the four tracks recorded relative to those on an 8-track endless tape cartridge so that channels (a pair of tracks is one stereo channel) 1 and 3 on an 8-track cartridge nearly correspond to channels 1 and 2 on a 4-track cartridge. This correspondence is not exact. Accordingly, merely scanning a 4-track cartridge in an 8-track player with the head positioned to scan channels 1 and 3 will not result in optimum performance. And 8-track players are normally arranged to step through the four channels in sequence so that with the head positioned to scan channels 2 and 4, the head is then positioned in such a way that the tape player reproduces essentially no meaningful program material when a 4-track cartridge is being scanned. Thus, the user of a tape player for selecting playing either 4-track or 8-track cartridges through manual selection must take steps to insure that the head is not positioned to scan channels 2 or 4. And upon completion of scanning a channel, the operator must manually cause the head to be displaced twice.

In is an important object of this invention to provide a tape player for playing cartridges with different numbers of tracks and automatically position the scanning head so that it is always in essentially the best scanning position, regardless of the number of tracks.

It is a more specific object of this invention to provide a tape player in accordance with the preceding object for playing 4-track and 8-track cartridges and automatically positioning the scanning head for substantially optimum performance.

It is a further object of this invention to achieve one or more of the preceding objects while automatically displacing the scanning head so that it is in position to scan one or the other of the pairs of tracks on a 4-track cartridge when a 4-track cartridge is inserted while being adapted for scanning in sequence the 4 pairs of tracks on an 8-track cartridge when an 8-track cartridge is inserted.

SUMMARY OF THE INVENTION

According to the invention, there is medium responsive means responsive to the presence of a first type recording medium for positioning the scanning head in a first multiplicity of scanning positions to scan a first multiplicity of channels in parallel relationship on the first recording medium having the first multiplicity of channels. The medium responsive means responds to the presence of a second type recording medium having a second multiplicity of parallel channels less than said first multiplicity to reduce the number of scanning positions of the scanning head to the second multiplicity by relatively displacing the scanning head and medium immediately upon assumption of at least one of the first scanning positions to another of the first positions to reduce the number of scanning positions to the second multiplicity. Preferably, the medium responsive means responds to the presence of the second type medium to slightly displace the second multiplicity of positions from all the first multiplicity of positions so that the scanning head is substantally optimally positioned for scanning the first multiplicity of channels when the first type medium is in position and for scanning the second multiplicity of channels when the second type medium is in scanning position.

More specifically, the second multiplicity may correspond to the first multiplicity divided by an integer, such as two. Preferably, means including a rotatable cam establish the first multiplicity of stable positions so that each complete displacement cycle of a cam sequentially displaces the scanning head through at least the first multiplicity of scanning positions, typically four corresponding to the four channels of an 8-track endless tape cartridge. Upon insertion of the second tape recording medium into scanning position, immediately upon assumption of one or more of the cam-established scanning positions another of these positions is assumed, typically by having a switch cam contact on the cam shaft coact with a switch arm contact to deliver additional drive energy to the cam shaft driving means so as to advance the cam to the next position. Preferably, means are provided for displacing the cam slightly in response to the presence of the second medium in the scanning position so that each of the second multiple of head positions is slightly displaced from a corresponding one of the first multiple of positions.

In a specific embodiment of the invention for playing both 4-track and 8-track endless tape cartridges, pressure roller means associated with the player rises from a withdrawn position only when a 4-track cartridge is inserted to actuate a feeler slide that both displaces the cam slightly and moves the switch arm contact to a position for cooperative relationship with the switch cam. The cam shaft drive means comprises a solenoid that is pulsed to effect a channel change. The switch cam and switch arm contact coact to deliver an additional pulse to the solenoid when a 4-track cartridge is in position to render the channel 2 and channel 4 positions unstable while the head is allowed to rest in either the channel 1 or channel 3 positions and scan substantially optimally either of the two pairs of tracks on a 4-track cartridge.

Numerous other features, objects and advantages of the invention will become apparent from the following specification when read in connection with the accompanying drawing which:

DETAILED DESCRIPTION OF PREFERRED EMBODIMENTS

Figures 1, 2, 3:
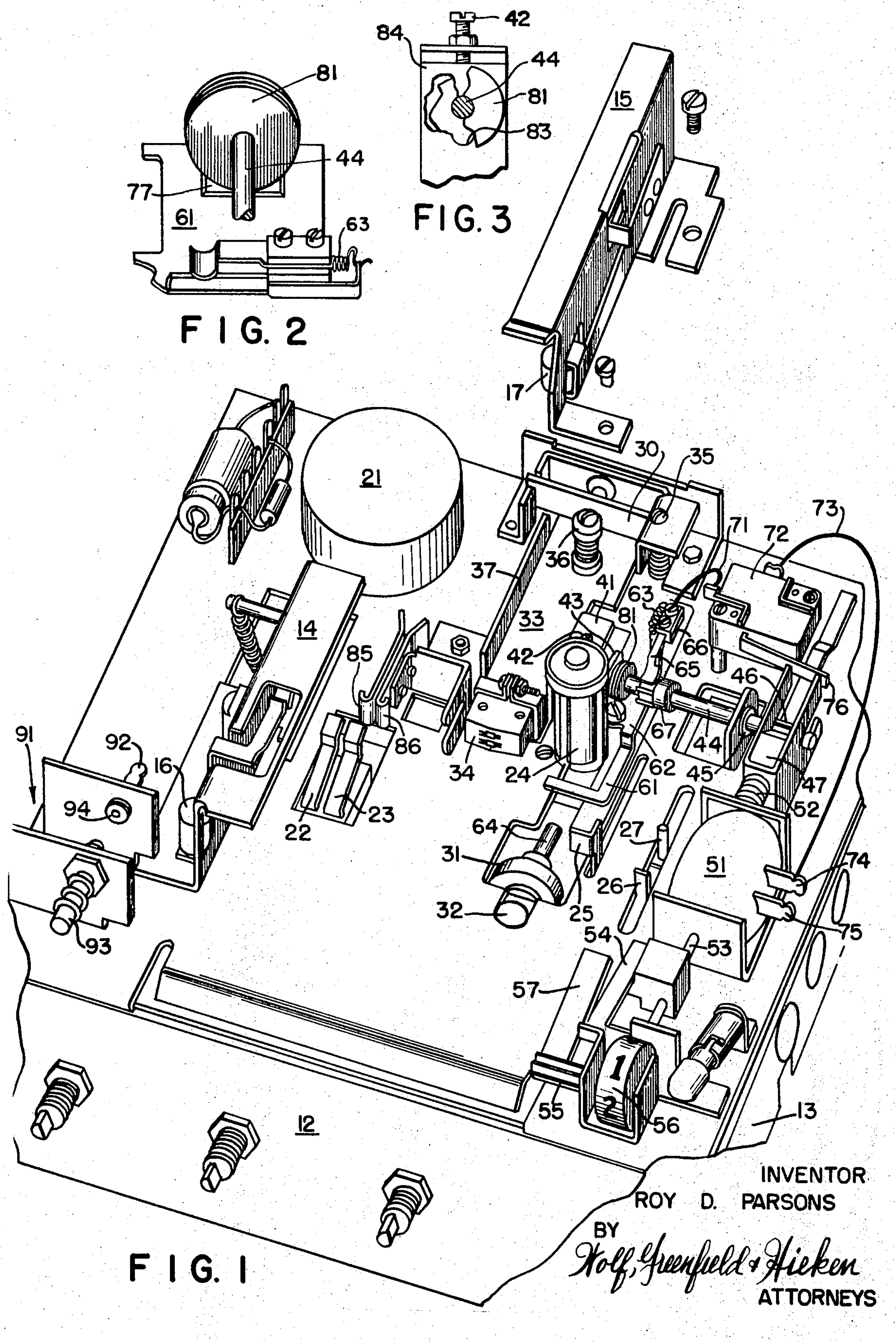
FIG. 1 is a perspective view of a preferred embodiment of the invention.
FIG. 2 is a prespective view of a detail of the invention illustrating how the cam shaft may be raised slightly when a 4-track cartridge is being scanned.
FIG. 3 shows a detail of the cam shaft support that permits advantageous slight vertical displacement of the cam shaft.

With reference now to the drawing, and more particularly FIG. 1 thereof, there is shown a perspective view of a preferred embodiment of the invention with a number of details omitted so as not to obscure the principles of the invention and the right guide bracket for the tape cartridge shown exploded so that it will not hide details of the structure according to the invention. The tape player includes a top chassis plate 11, front chassis plate 12 through which the various control shafts protrude, and a side chassis plate 13. A left bracket 14 and a right bracket 15 (shown exploded from the chassis so as not to obscure details of the invention) guide a cartridge into and maintain the cartridge in playing position with the left bracket roller 16 and the right bracket roller 17 facilitating easy insertion and withdrawal. The right bracket roller 17 is spring loaded as shown so that roller 17 may reside in a notch in the cartridge to keep the cartridge firmly in playing position. A drive motor 21, when energized as both power microswitch 22 and microswitch 23 are depressed by insertion of a tape cartridge, drives capstan 24 through suitable coupling means.

When a 4-track cartridge is inserted, means including the pressure roller actuating lever 25, the pressure roller actuating slide 26 and the pressure roller axle stem 27 coact to expel the pressure roller 31 from the withdrawn position shown below the chassis so that it urges the tape in the 4-track cartridge against the capstan 24 as the front of the cartridge urges the pressure roller actuating lever 25 toward capstan 24.

When a 8-track or other cartridge having a self-contained pressure roller is inserted, the bottom of the cartridge depresses the detent 32 when the front of the cartridge just engages pressure roller actuation lever 25 to effectively decouple lever 25 from slide 26 and allow pressure roller 31 to remain in the withdrawn position. This mechanism is embodied in an Automatic Radio commercially available 4- and 8-track player.

When an Automatic Radio commercially available tuner cartridge is inserted, only power microswitch 22 is depressed to energize the amplifying portion of the tape player while motor microswitch 23 resides in a groove in the tuner cartridge to remain open so that motor 21 remains de-energized when a tuner cartridge is being played.

The head support bracket 33 supports the stereo scanning head 34 and is slightly pivotable about the axis embraced by bar 30 with a spring loaded screw 35 permitting azimuth adjustment of head support 33 and spring loaded screw 36 permitting elevation adjustment. Head support bracket 33 is formed with an inverted L-shaped portion 41 carrying a screw 42 that rides on head positioning cam 43 having four stable points in each 180° cam cycle separated by substantially 45° upon which screw 42 rests to establish the four stable positions of scanning head 34 normally corresponding to the proper positions for scanning the four channels in sequence on a 8-track cartridge.

Cam 43 is supported on cam shaft 44 which rotates in a bearing and support 45 and carries an actuating gear 46 that is displaced 45° by pawl 47 each time solenoid winding 51 is pulsed as the solenoid plunger to which pawl 47 is attached is returned by solenoid spring 52. The front end of solenoid plunger 53 also carries a pawl assembly 54 for actuating gear 55 through 45° each time solenoid winding 51 is pulsed to advance indicating wheel 56 to a position indicating the channel then being scanned, ratchet 57 maintaining that indication until the next impulse. This indicating arrangement is embodied in commercally available automatic radio tape players.

The foregoing description sets forth the background for understanding the elements of the present invention.

A feeler slide 61 is urged against chassis plate 11 by slide retaining spring 62. Normally feeler slide 61 is urged further away from drive capstan 24 by slide return spring 63 when pressure roller 31 is in the position shown. However, for purposes of illustrating the principles of the invention, feeler slide 61 is shown in the position that it occupies when a 4-track cartridge is in place and pressure roller 31 fully expelled so that the pressure roller shaft 64 urges feeler slide 61 into the position shown.

Feeler slide 61 carriers a cam contact arm 65 on an insulating block 66 that will contact any one of the four points on 4-point switch cam 67 carried by cam shaft 44 only when the scanning head 34 is positioned to scan channels 2 and 4. Contact arm 65 is connected to lead 71 to normally closed microswitch 72 in series with solenoid winding 51 through the connecting lead 73 and solenoid winding terminal 74. The other solenoid winding terminal 75 is connected to the ungrounded terminal of a potential source, such as a battery. When contact arm 65 is in contact with one of the points on cam 67, the return to ground for solenoid winding 51 is completed through means including the cam shaft 44 to energize solenoid winding 51 until the solenoid plunger 53 is thrown far enough so that microswitch lever 76 is released. With microswitch 72 then open solenoid winding 51 is de-energized allowing pawl 47 to actuate gear 46 so as to displace the cam shaft 44 to a stable position such as that shown with contact arm 65 between points of 4-point switch cam 67.

Referring also to FIG. 2, there is shown a detailed perspective view of the means for displacing the scanning head slightly so as to position it for optimum scanning of the two pairs of tracks on a 4-track cartridge. To this end, feeler siled 61 carries a ridge 77, typically 6 mils high to effect a rise of 17 mils at the surface of scanning head 34 where it scans the tape. An adjuster bearing 81 on cam shaft 44 rides on ridge 7 when feeler slide 61 is in the position shown, but moves toward the front of the player when feeler slide 61 is positioned forward at times when pressure roller 31 is in the withdrawn position so that scanning head 34 is 17 mils lower in each of these four stable positions to optimally scan an 8-track tape cartridge. Then contact arm 65 is also moved forward to a position where it is unable to contact any of the points on 4-point switch cam 67.

Referring to FIG. 3, there is shown a detail of how cam shaft 44 is supported in adjuster bearing 81 that rides in a vertical slot 83 of shaft support member 84 to permit slight vertical movement of the cam shaft as ridge 77 moves beneath and out from under adjuster bearing 81. This head adjuster bearing 81 is typically displaced 6 mils and is pivotable about the bearing 45 just at the inside of the solenoid plunger to produce a displacement of about 8½ mils at the adjusting screw 42 which rides on the head positioning cam 43. This in turn provides a displacement of 17 mils at the point on the scanning head 34 which pivots about bar 34 as indicated above.

The tape player also includes a pair of insulatedly separated candy cane contacts 85 and 86 which are typically connected by leads (not shown) between solenoid winding terminal 74 and ground. These candy cane contacts are adapted to scan the tape in an endless tape cartridge and be interconnected by a small length of conducting foil signifying the completion of scanning a channel of the cartridge and thereby pulse solenoid winding 51. This pulsing automatically shifts the scanning head to its next sequential position to scan the next channel on the tape cartridge. If an 8-track cartridge is being played, the head position will advance so that the indicating wheel 56 will be stepped 45° to advance by one indicated number, a cycle being repeated every 180°. If a 4-track cartridge is being played, the head will be advanced so that indicating wheel 56 will be stepped 90° to advance by two numbers and will reside in either the channel 1 or channel 3 indication.

The 8-track cartridge has a clearance of 25 mils over the tape deck which is high enough so that it does not actuate feeler lever 61. However, the invention will work for a 4-track cartridge with an adaptor of the type disclosed in the copending application of John S. DeMetrick entitled Tape Cartridge Insert, Ser. No. 616,962, filed Feb. 17, 1967 and assigned to the assignee of this application. The base plate of the 4-track cartridge insert is low enough to actuate the feeler lever 61.

Briefly reviewing the mode of operation, the 4-point switch cam 67 is completely disabled except when activated upon insertion of the 4-track cartridge because the contact arm 65 must be displaced toward the rear of the tape player so that the contact point of the arm is above the axis of cam shaft 44 and can contact one of the four points. It contacts one of the four points only when the tape player has just been set to either of channels 2 or 4. This connection results in an impulse being transmitted to solenoid winding 51 through the normally closed microswitch 72 that is maintained closed by the rear finger of the solenoid plunger 53. Microswitch 72 does not again open until after a short delay sufficient to allow solenoid plunger 53 to make a complete throw actuating the indicator and being returned by the solenoid return spring 52 to displace the cam shaft 44 to an odd channel position. When solenoid 51 thus then again resumes its rest position, it again closes microswitch 72 but does not receive another impulse because the contact point of contact arm 65 is at a position midway between the points of the 4-point switch cam 67. Since a typical tape player also includes a switch such as 91 having a terminal 92 that is connected to soleoid winding terminal 74 through leads (not shown) to return the winding to ground when spring-loaded shaft 93 is pushed rearward to contact contact 94, each selection of a channel change, whether by the switch 91 or automatically by the interconnection of the candy cane contacts 85 and 86, results in the channel of a 4-track cartridge being changed from 1 to 3 to 1 to 3 repeatedly each time channel change is designated automatically manually. When the 8-track cartridge is inserted, the channel is changed from 1 to 2 to 3 to 4 to 1 to 2 to 3 to 4 repeatedly each time channel change is designated manually or automatically.

The specific embodiment described is by way of example only illustrating the best mode now contemplated for practicing the invention. Those skilled in the art may apply the principles of the invention through the use of different techniques and mechanisms too numerous to mention.

It is evident that those skilled in the art may now make numerous uses and modifications of and departures from this specific embodiment described herein without departing from the invention concepts. Consequently, the invention is to be construed as embracing each and every novel feature and novel combination of features present in or possessed by the apparatus and techniques herein disclosed and limited solely by the spirit and the scope of the appended claims.

The embodiments of the invention in which an exclusive property or privilege is claimed are defined as follows:

1. Apparatus for scanning parallel channels on a recording medium contained in either of two types of recording assemblies, said recording medium in a first of said two types containing a greater plurality of channels than the second of said two types, said apparatus comprising, scanning head means in said apparatus, recording assembly responsive means responsive to the presence of said first type recording assembly for conditioning said apparatus to move said scanning head means relative to the recording medium being scanned in a direction along a first plurality of scanning positions to scan said first plurality of channels in parallel relationship on the recording medium of said first type recording assembly having said first plurality of channels, said recording assembly responsive means including means responsive to the presence of said second type recording assembly with recording medium having said second plurality of channels less than said first plurality of channels for relatively displacing said scanning head means and said recording medium in said direction along said scanning positions immediately upon assumption of at least one of said first plurality of scanning positions to another of said first plurality of scanning positions to effectively reduce the number of scanning positions of said scanning head means relative to the recording medium being scanned to said second plurality.

2. Apparatus for scanning parallel tracks in accordance with claim 1 wherein said recording assembly responsiveness means includes displacing means for effecting a displacement between said scanning head means and said first type recording assembly slightly different from that between said scanning head means and said second type recording assembly to center said scanning head means on the tracks being scanned and achieve substantially optimal scanning regardless of the type recording assembly medium being scanned.

3. Apparatus for scanning parallel tracks in accordance with claim 1 wherein said recording assembly responsive means comprises means including a rotatable cam shaft, cam means supported upon said cam shaft for establishing said scanning positions, switch cam means supported upon said cam shaft, switch arm means, electromotive means responsive to an electrical energy impulse for displacing said cam shaft by an increment corresponding to that required to change from one of said first plurality of scanning positions to the next said first plurality of positions, means responsive to the presence of said second type recording assembly for enabling coaction between said switch cam means and said switch arm means for delivering an impulse of electrical energy to said electromotive means when said cam means establishes predetermined ones of said first plurality of said scanning positions to thereby establish the next scanning position, the latter means being responsive to the presence of said first type recording assembly for disabling coaction between said switch cam means and said switch arm means so that all of said first plurality of scanning positions may be assumed long enough to scan a corresponding plurality of channels of said first type recording assembly.

4. Apparatus for scanning parallel tracks in accordance with claim 3 wherein said means responsive to the presence of said recording assemblies includes means for positioning said cam shaft when a first type assembly is present slightly displaced from its position when a second type assembly is present to center said scanning head means on the tracks being scanned and achieve substantially optimal scanning regardless of the type recording assembly medium being scanned.

5. Apparatus for scanning parallel tracks in accordance with claim 3 and further comprising, microswitch means in series with switching means comprising said switch arm means and said switch cam means responsive to actuation of said electromotive means for interrupting the flow of electrical energy to said electromotive means, and spring means for restoring said electromotive means to a normal rest position upon said interrupting the flow of electrical energy.

6. Apparatus for scanning parallel tracks in accordance with claim 5 wherein said electromotive means includes, pawl means for displacing said cam shaft a predetermined angular increment in response to each electrical impulse applied to said electromotive means, said switch cam means having a plurality of points separated by an angular increment that is an integral multiple of said predetermined angular increment and positioned on said cam shaft so that when said switch arm means and said switch cam means are enabled for coaction, one of said points contacts said switch arm means whenever said cam means establishes said predetermined one of said first plurality of said scanning positions to thereby establish the next scanning position.

7. Apparatus for scanning parallel tracks in accordance with claim 6 wherein said means for positioning includes, slide means for both moving said switch arm into position enabling coaction with said switch cam means and displacing said cam shaft, bearing means carried by said cam shaft riding in cam shaft support means formed with a slot allowing slight translational displacement of said bearing means, said slide means including means defining a ridge adapted to engage and lift said bearing means only when said second type recording assembly is in position for being scanned.

8. Apparatus in accordance with claim 7 wherein said first type recording assembly is an 8-track tape cartridge that clears said slide means when inserted into position for being scanned and said second type recording assembly is a 4-track tape cartridge that engages said slide means when inserted into position to then both move said switch arm into position enabling coaction with said switch cam means and move said ridge beneath said bearing means.

References Cited

UNITED STATES PATENTS

| | | | |
|---|---|---|---|
| 3,337,105 | 8/1967 | Wilson | 274—4 |
| 3,400,227 | 9/1968 | Lear et al. | 179—100.2 |
| 3,388,911 | 6/1968 | Wilson et al. | 274—4 |

LEONARD FORMAN, Primary Examiner

D. A. DEARING, Assistant Examiner

U.S. Cl. X.R.

179—100.2